United States Patent [19]

Andersson

[11] Patent Number: 4,705,491

[45] Date of Patent: Nov. 10, 1987

[54] TELESCOPIC GUIDE, ESPECIALLY FOR TRANSMITTANCE OF TORQUE

[75] Inventor: Henry Andersson, Saltsjo-boo, Sweden

[73] Assignee: Affarsverket FFV, Eskilstuna, Sweden

[21] Appl. No.: 816,349

[22] Filed: Jan. 6, 1986

[30] Foreign Application Priority Data

Jan. 22, 1985 [SE] Sweden ................... 8500286

[51] Int. Cl.$^4$ ............................................. F16D 3/06
[52] U.S. Cl. .................................... 464/167; 384/10; 384/49; 464/180
[58] Field of Search ............... 74/492, 493; 308/6 R; 464/83, 162, 167, 180; 384/7, 10, 49, 25

[56] References Cited

U.S. PATENT DOCUMENTS

| | | | |
|---|---|---|---|
| 3,183,684 | 5/1965 | Zeidler | 464/83 X |
| 3,797,276 | 3/1974 | Orain | 464/167 |
| 4,254,639 | 3/1981 | Teramachi | 464/167 |
| 4,311,027 | 1/1982 | Krude | 464/167 |
| 4,509,386 | 4/1985 | Kimberlin | 74/492 |

FOREIGN PATENT DOCUMENTS

| | | | |
|---|---|---|---|
| 2804778 | 8/1979 | Fed. Rep. of Germany | 464/167 |
| 1373752 | 8/1964 | France | 464/167 |

*Primary Examiner*—Daniel P. Stodola
*Attorney, Agent, or Firm*—James E. Nilles

[57] ABSTRACT

A telescoping torque transmitting shaft comprising a shaft having at least three longitudinally extending circumferentially spaced guide grooves and a sleeve axially slidably surrounding the shaft and having an inner counter groove opposite each guide groove. Torque is transmitted between the shaft and the sleeve by a row of balls for each guide groove, each ball being partially received in its guide groove and partially received in the counter groove opposite its guide groove. At least certain of the balls in one row are of resilient elastic material; all others are substantially harder. Bias imposed upon the shaft by the resilient balls, urging the shaft in one lateral direction relative to the sleeve, maintains every ball in torque transmitting contact with both the shaft and the sleeve, while the harder balls in the other rows, by such contact, maintain the elastic balls compressed for exerting such bias.

6 Claims, 4 Drawing Figures

TELESCOPIC GUIDE, ESPECIALLY FOR TRANSMITTANCE OF TORQUE

The present invention generally relates to a telescopic guide, and more particularly the invention is directed to a telescopic guide useful for transmittance of torque in alternating directions and of the type which comprises a telescopic shaft having at least three guide grooves provided round said telescopic shaft, an outer telescopic sleeve having inner axial counter grooves distributed round the sleeve exactly or almost exactly like the guide grooves of the telescopic shaft, and a number of transmittance elements provided between the guide grooves of the telescopic shaft and the counter grooves of the telescopic sleeve.

For transmitting torque at the same time as motion of some of the transmittance means axially it is known to use splines both when the torque is transmitted in one and the same direction or in alternating directions. It is, however, relatively expensive to make splines, and they often give a slight play between the spline shaft and the spline sleeve, which play is especially noticeable when transmitting torque of alternating directions. Further, a spline shaft becomes worn in time, whereby the play is increased. Also a spline shaft gives a hard impacting power transmittance, and in splines having narrow tolerances there may be problems with the telescopic displacement of the mutually displaceable means. A telescopic displacement of a spline connection always is a sliding displacement which gives undesired counter friction forces during said displacement.

For providing a telescopic guide which gives less play and lash than a spline connection, which is more easy to manufacture, and in which the displacement is made by rolling contact and without any sliding friction the German Patent Publication DOS No. 2,051,777 suggests a telescopic guide comprising a telescopic shaft having several axial guide grooves distributed round said shaft, an outer telescopic sleeve formed with equivalent guide grooves, and balls provided between the two sets of guide grooves. Also said known telescopic guide becomes worn in time and gives play and lash, especially when transmitting torque of alternating directions, and it also may be difficult to originally make the guide completely free of play. Also the said telescopic ball guide gives a relatively hard, impacting transmittance of torque.

The object of the invention therefore has been to solve the problem of providing a telescopic guide of the above mentioned type which is formed so as to give a play free and lash free transmittance of torque, even torque of alternating directions, which gives a slightly elastic torque transmittance between the telescopic shaft and the telescopic sleeve, in which the mutual telescopic displacement of the shaft and the sleeve is made practically completely by rolling contact, and which is very insensitive to wear, whereby the telescopic guide is prevented from obtaining play and lash even during long and stressing use.

A telescopic guide of this type is formed with at least three axial guide grooves distributed round the telescopic shaft, an outer telescopic sleeve having inner axial counter grooves distributed round the sleeve substantially like the guide grooves of the telescopic shaft, and a number of transmittance elements, preferably balls, provided between the guide grooves of the telescopic shaft and the counter grooves of the telescopic sleeve, and the telescopic guide is in the first place characterized in that at least one of the transmittance elements of the telescopic guide is of an elastic material whereas the other transmittance elements are of a harder material.

By "elastic" and "harder" material respectively is in this connection meant only that the two types of material are so related to each other that the "elastic" material is more elastic than the defined "harder" material, and as will be evident from the following a suitable synthetic resin material can be used as an "elastic" material, whereas a metal like steel can be used as the "harder" material. It is, however, possible within the invention to use two plastic materials of different elasticity or any other combination of materials which give the same difference in elasticity, related to each other as mentioned above.

Preferably the elastic transmittance element or elements are made slightly larger than the corresponding grooves or counter grooves, so that the elastic transmittance element becomes slightly compressed in its mounted state. Further the grooves of the telescopic shaft can be provided with a slight circumferential displacement in relation to the counter grooves of the telescopic sleeve, especially as concerns the transmittance elements of harder material, at the same time as said harder transmittance elements are formed slightly smaller than the transmittance grooves of the telescopic shaft and the telescopic sleeve, whereby it is possible to foresee that at least one transmittance element of harder material provides the main force transmittance in one direction of rotation, whereas at least one other transmittance element of harder material provides the power transmittance in the opposite direction. The circumferential displacement between the shaft grooves and the sleeve counter grooves preferably is such that the main contact points on both sides between the transmittance element on one hand, and the telescopic shaft and the telescopic sleeve on the other hand, are located in planes which are parallel for two cooperating transmittance elements of harder material.

Further characteristics and advantages of the present invention will be evident from the following detailed description in which references will be made to the accompanying drawings.

In the drawings FIG. 1 diagrammatically and in a cut open state shows a telescopic guide according to the invention.

A telescopic guide according to the invention is useful in any case where it is desired to transmit torque between two machine parts while at the same time allowing an axial displacement of the machine parts of the guide, and in which a play free but still slightly elastic torque transmission in alternating directions of rotation is wanted. One field of use for the telescopic guide according to the invention is a steering column for motor cars, where relatively large forces in alternating directions are transmitted from the steering wheel to the steering links of the car, and in which it is desired to make possible a height adjustment of the steering wheel as seen in the axial direction of the telescopic guide. A telescopic guide for the steering column also serves the important purpose of being shock absorbing in case of heavy retardations, as in a crash, whereby it may be possible to eliminate the need of the otherwise usual deformation zones of the steering columns.

Figure 1:
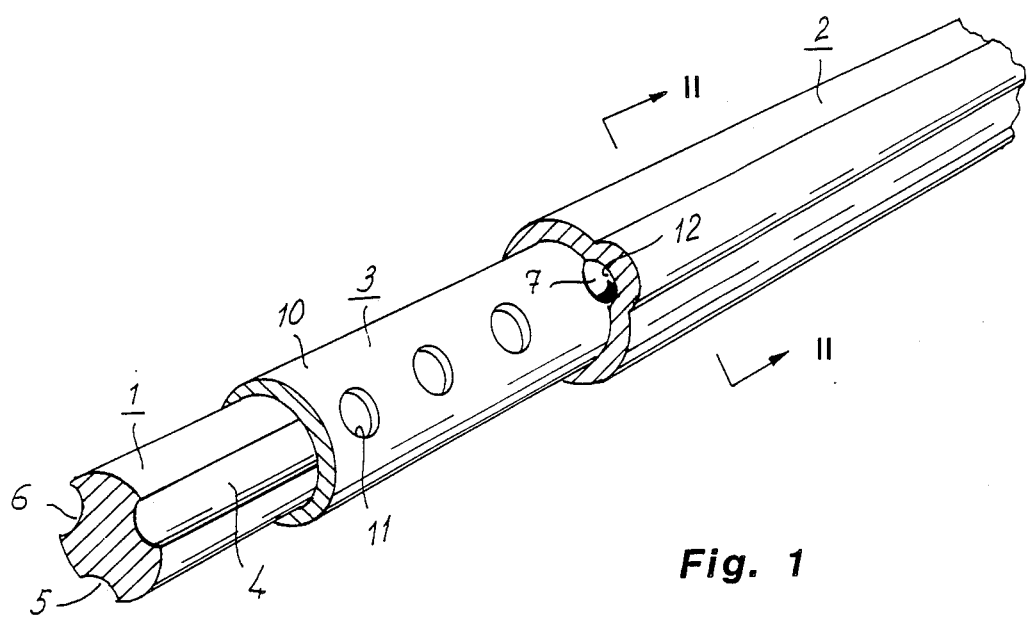
Figure 2:
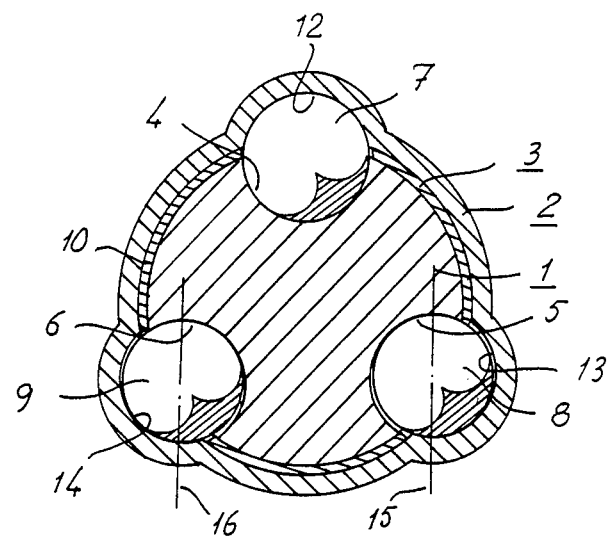
FIG. 2 is a cross section through the telescopic guide of FIG. 1 as seen along line II—II.

The telescopic guide shown in FIGS. 1 and 2 generally comprises a telescopic shaft 1, a telescopic sleeve 2 and a torque transmittance means 3 provided between the shaft 1 and the sleeve 2.

The telescopic shaft 1, which can be of any suitable material that is resistant to rotation, like a suitable plastic material or a metal, preferably light metal or steel, is formed with three guide grooves 4, 5, 6 which are evenly or almost evenly distributed round the shaft and extend along a distance of the shaft which corresponds to half the intended telescopic displacement. As will be further explained in the following the guide grooves may, however, be slightly displaced with reference to the even circumferential distribution, for instance so that the angle between the guide grooves 4 and 5 and that between the guide grooves 6 and 4, respectively, is slightly greater than 120°, for instance 1-4 degrees greater than 120°. The guide grooves 4-6 are intended for a rolling contact by guide balls 7, 8 and 9 which are held in position by a ball guide sleeve 10 having corresponding ball guide bores 11, arranged in three rows corresponding to the guide grooves 4-6 of the telescopic shafts. The number of balls and equivalent guide bores are calculated considering both the intended torque to be transmitted and considering the wanted deflection stability and strength of the telescopic shaft 1 and the telescopic sleeve 2. As an example may be mentioned that each row of balls should contain 10 balls, but the number may be larger or smaller depending upon the intended field of use and the torque to be transmitted between the shaft 1 and the sleeve 2. The distance between the ball guide bores 11 and the belonging balls 7 can be varied according to need and wish, but in a practical embodiment the ball bores are distributed on distances about 1.2 times the diameter of the ball and the ball bores respectively. The guide grooves 4, 5 and 6 of the telescopic shaft 1 have a radius which in some cases is the same as or slightly larger than the diameter/2 of the ball; in other cases the radius of the guide grooves is slightly less than the diameter/2 of the ball as will be explained in detail in the following. The depth of the guide grooves 4-6 is slightly less than half the ball diameter.

The telescopic sleeve 2 is formed with inner guide grooves 12, 13 and 14, the shape, size and location of which substantially correspond to the guide grooves 4-6 of the telescopic shaft 1. As mentioned with respect to the guide grooves 4-6 of the telescopic shaft the inner guide grooves 12-14 may have a mutual distribution which is slightly different from an even distribution, for instance an angle difference of 1°-4°. The telescopic shaft 1, the telescopic sleeve 2 and the ball guide sleeve 10 are formed with such mutual dimensions that the three parts can be moved in relation to each other with a light slip fit.

It should be noted that the torque transmittance means may be rolls mounted in the axial direction of the telescopic guide or with the axis thereof placed transversely to the longitudinal axis of the guide. In the former case a slide friction is obtained, and this is not really wanted. In the latter case a roll friction is obtained and this is to be preferred. The embodiment of the invention having rolls may, however, give manufacturing problems, since in such case both the guide grooves 4-6 and the counter grooves 12-14 and the bores 11 of the guide sleeve 10 must be formed considering the square cross section form of the rolls as seen projected in the plane. Therefore balls are to be preferred.

For providing a slightly resilient action at least one of the balls, in the embodiment illustrated in FIG. 2 the ball 7, is made of a slightly elastic material, whereas the other balls 8 and 9 are made of a hard material like steel. As mentioned above the expressions "elastic" and "hard" material only relate to a mutual relationship of elasticity between the materials of the two sets of balls. The material of the elastic guide ball 7 can be a suitable resin which is sufficiently hard not to give a too strong elastic compression and which at the same time preferably is self-lubricating, and as a suitable material for said "elastic" ball can be mentioned any amide resin such as "Nylon" or any equivalent resin. For providing the intended elasticity the elastic ball 7 preferably is mounted with some pretension in that the ball is given a slightly larger diameter than the diameter of the guide grooves 4. In a practical emobodiment of the invention the guide groove 4 of the telescopic shaft 1 was formed with a curvature equivalent to a diameter of 6 mm, whereas the ball 7 was given a diameter of 6.35 mm. Thereby the elastic ball 7 was contacting its guide grooves under some compression.

The other guide elements were provided oppositely, namely so that the guide grooves 5 and 13 and the guide grooves 6 and 14 respectively for the hard balls 8 and 9 were formed with a diameter of 6.35 mm whereas the balls 8 and 9 had a diameter of 6.0 mm. As mentioned above the guide bores 5 and 6 for the hard balls 8 and 9 were, also slightly displaced as compared with an even circumferential distribution of the guide grooves, for instance so that the angle between the guide grooves 4 and 5 and the guide grooves 6 and 4, respectively, was 122°, whereas consequently the angle between the guide grooves 5 and 6 was 116°. Alternatively or in combination therewith the counter grooves 12, 13 and 14 can be located with an uneven distribution, that is so that the angle between the counter grooves 12 and 13 and the counter grooves 14 and 12 respectively is less than 120°. The purpose thereof is that the two balls 8 and 9 should be clapped into contacts with the upper edge of the guide grooves 5 and 6 and the lower edge of the counter grooves 13 and 14. Thereby a contact is obtained in a plane between the hard balls 8 and 9, on one hand, and the telescopic shaft 1 and the telescopic sleeve 2, on the other hand, which is differing from a radial plane, and which preferably is vertical as shown with the dotted lines 15 and 16 in FIG. 2. The planes of contact 15 and 16 for the two hard balls 8 and 9 thereby are parallel, and this means that the illustrated right ball becomes compressed in the clockwise direction by rotation of the telescopic shaft 1 in the clockwise direction, whereas the left ball 9 becomes compressed in the counter clockwise direction by rotation of the shaft in the counter clockwise direction. Generally it could be said that the right ball takes the main part of the drive forces in the clockwise direction, whereas the left ball 9 takes the main part of the drive forces upon counter clockwise rotation.

In case of progressive wear in the guides for the hard balls 8 and 9 this is compensated for by the elastic ball 7 which is not subjected to any noticable wear.

In order to guarantee that there is not a too strong resiliency in the system when the shaft is rotated in alternating directions one or more balls in the rwo or set of elastic balls 7 can be replaced by hard balls, so called guarantee balls.

Figure 3:
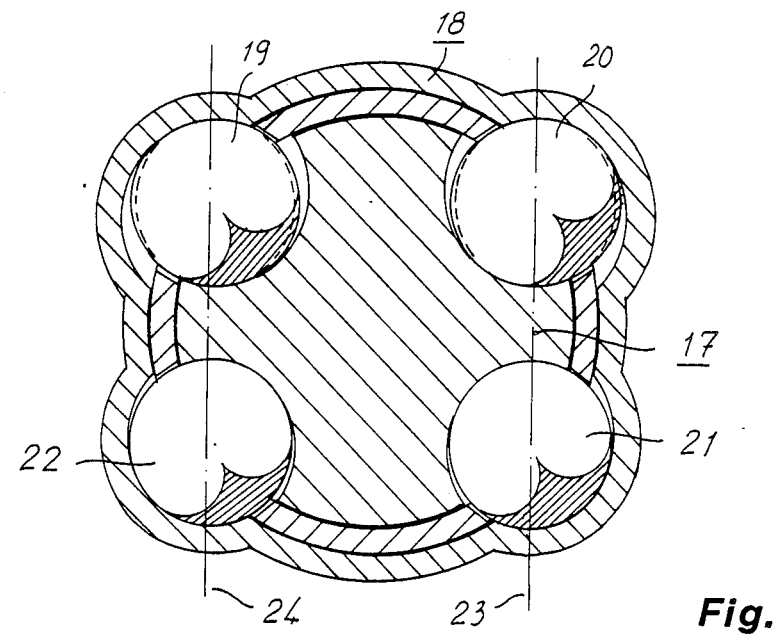
FIG. 3 is a cross section through an alternative embodiment of a telescopic guide according to the invention.

FIG. 3 shows an alternative embodiment of the invention, in which the telescopic shaft 17 and the telescopic sleeve 18 are formed with four equivalent grooves, and in which two of the balls 19 and 20 are of elastic types, whereas the two remaining balls 21 and 22 are of hard type. The ball grooves of the telescopic shaft 17 and/or the telescopic sleeve 18 are displaced as compared with an even circumferential distribution substantially as described in connection to the embodiment of FIGS. 1 and 2, and it is evident that the elastic balls 19 and 20 at the lower ends thereof contact the telescopic shaft 17 and at the upper ends thereof contact the telescopic sleeve 18, whereas the hard balls 21 and 22 oppositely contact the telescopic shaft 17 with their upper ends and the telescopic sleeve 18 with their lower ends. Thereby likewise substantially vertical and parallel planes of contact 23 and 24 are obtained. FIG. 3 shows that the two elastic balls 19 and 20 are slightly compressed, and the dotted lines illustrate the normal, non-compressed condition of said balls.

Figure 4:
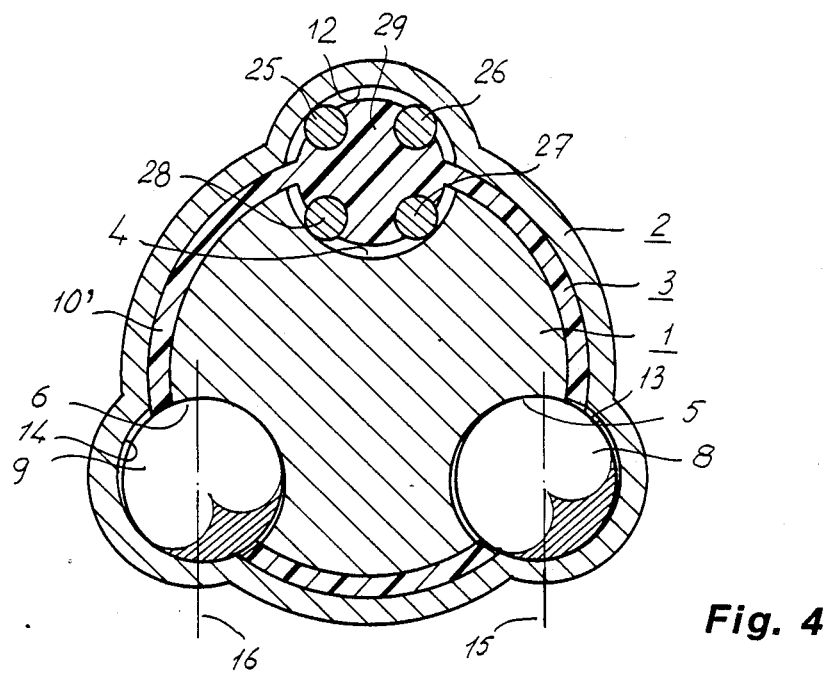
FIG. 4 shows a further alternative of the telescopic guide according to the invention.

FIG. 4 shows an alternative embodiment of the triple telescopic guide described in connection with FIGS. 1 and 2. In FIG. 4 the elastic ball is replaced by four small elastic balls 25-28 mounted in a thickened part 29 of the ball guide sleeve 10'. This embodiment of the invention is advantageous relative to the embodiment according to FIGS. 1 and 2 in that a decreased roller surface is obtained for the elastic balls 25-28 and thereby a decreased rolling resistance is obtained for the elastic balls.

In a further alternative embodiment of the invention the ball guide sleeve 10' is made of an "elastic" plastic material, whereas the small balls 25-28 are made of steel, whereby consequently the thickened plastic part 29 gives the intended elasticity in favour of the small steel balls 25-28.

For manufacturing reasons it may be advantageous to form the thickened part 29 as one or more separate plastic rods which in any suitable way are guided in the ball guide sleeve 10' and each of which has a suitable number of small guide balls 25-28.

It is obvious to the expert that the embodiments of the invention which are described above and have been shown in connection with the accompanying drawings are only illustrative examples and that many different modifications may be presented within the scope of the appended claims.

What is claimed is:

1. A telescoping device for transmitting torque in opposite directions of rotation, of the type comprising a telescopic shaft having at least three axially extending guide grooves therein that are spaced apart circumferentially, a telescopic sleeve axially slidably surrounding said telescopic shaft along at least a part of its length and having inwardly opening axially extending counter grooves, one for each guide groove, said counter grooves being so spaced circumferentially that each is opposite its guide groove, and a plurality of torque transmitting round elements, each being of circular cross-section and being received in part in one of said guide grooves and in part in its opposite counter groove, characterized in that:

A. certain of the round elements, received in one of said guide grooves and in its opposite counter groove, are of resiliently elastic material and are under resiliently deformed compression between said telescopic shaft and said telescopic sleeve; and B. all of the round elements that are received in two other guide grooves and in the respective counter grooves opposite those guide grooves
  (1) are of substantially harder and less resilient material than said certain round elements,
  (2) cooperate with surfaces of the grooves in which they are received to maintain said certain round elements under said compression, and
  (3) are themselves maintained in torque transmitting engagement with said surfaces by the reaction force due to said compression.

2. The telescoping device of claim 1 wherein each of said grooves is curved on a radius across its width and wherein each of said round elements is a ball, further characterized in that:
  (1) each of said certain round elements has a radius at least as great as the radius of said one guide groove and of its opposite counter groove, and
  (2) each of the round elements that are received in said two other guide grooves and their respective opposite counter grooves has a radius smaller than the radii of the guide groove and counter groove in which it is received.

3. The telescoping device of claim 2, further characterized by:
  each of said two other guide grooves being spaced circumferentially from said one guide groove by a distance which is greater than the circumferential distance between said two other guide grooves.

4. The telescoping device of claim 2, further characterized by:
  said two other guide grooves being spaced from said one guide groove by circumferential distances which are equal and which are greater than the circumferential distance between said two other guide grooves.

5. The telescoping device of claim 1 wherein said telescopic shaft has four guide grooves therein, further characterized by:
  (1) further round elements that are of resiliently elastic material being received in a second one of said guide grooves and in its opposite counter groove and being under resiliently deformed compression between said telescopic shaft and said telescopic sleeve;
  (2) said second guide groove being circumferentially adjacent to said one of said guide grooves; and
  (3) said two other guide grooves being circumferentially adjacent to one another.

6. The telescoping device of claim 1, wherein a plurality of round elements is received in each of said guide grooves and its opposite counter groove, further characterized by:
  at least one substantially hard and inelastic round element being received in said one of the guide grooves and its opposite counter groove for preventing damage to said resiliently elastic round elements upon the transmission of an excessive torque force between the telescopic shaft and the telescopic sleeve.

* * * * *